United States Patent
Chen et al.

(10) Patent No.: US 9,157,928 B2
(45) Date of Patent: Oct. 13, 2015

(54) MICROELECTRONIC DEVICE TESTING APPARATUS AND METHOD

(75) Inventors: Wei Chen, Franklin, MA (US); Huy Khanh Tang, Westford, MA (US)

(73) Assignee: Analog Devices, Inc., Norwood, MA (US)

(*) Notice: Subject to any disclaimer, the term of this patent is extended or adjusted under 35 U.S.C. 154(b) by 596 days.

(21) Appl. No.: 13/423,466

(22) Filed: Mar. 19, 2012

(65) Prior Publication Data

US 2013/0239692 A1    Sep. 19, 2013

(51) Int. Cl.
*G01P 21/00* (2006.01)
*G01M 7/04* (2006.01)

(52) U.S. Cl.
CPC .............. *G01P 21/00* (2013.01); *G01M 7/045* (2013.01)

(58) Field of Classification Search
CPC ....... G01P 21/00; G01M 7/045; G01C 25/005
USPC ................. 73/1.37, 1.38, 1.77, 663, 667
See application file for complete search history.

(56) References Cited

U.S. PATENT DOCUMENTS

| | | | | |
|---|---|---|---|---|
| 3,044,292 | A | * | 7/1962 | Matthews ................. 73/667 |
| 4,385,524 | A | * | 5/1983 | Cappel ..................... 73/663 |
| 5,644,087 | A | | 7/1997 | Liu .......................... 73/633 |
| 6,190,032 | B1 | * | 2/2001 | Choda ..................... 366/208 |
| 6,443,013 | B1 | | 9/2002 | Smith et al. ............. 73/663 |
| 6,877,374 | B2 | | 4/2005 | Geen ..................... 73/504.14 |
| 7,066,004 | B1 | * | 6/2006 | Kohler et al. ............ 73/1.38 |

* cited by examiner

*Primary Examiner* — John Chapman, Jr.
(74) *Attorney, Agent, or Firm* — Sunstein Kann Murphy & Timbers LLP

(57) ABSTRACT

A microelectronic device tester has a mounting member (for mounting a device), a drive shaft connected to the mounting member, and a vibration shaft mechanically in communication with the drive shaft. The drive shaft and vibration shaft are non-coaxial, and the drive shaft has a drive shaft proximal end and a drive shaft distal end. The drive shaft proximal end is connected to the mounting member, and the drive shaft distal end terminates proximal of the entire vibration shaft.

14 Claims, 4 Drawing Sheets

MICROELECTRONIC DEVICE TESTING APPARATUS AND METHOD

FIELD OF THE INVENTION

The invention generally relates to microelectronic device testers and, more particularly, the invention relates to high speed microelectronic device testers.

BACKGROUND OF THE INVENTION

Microelectronics device manufacturers often must test their components before delivering them to a customer for integration into a larger system. For example, MEMS gyroscopes, which measure rotation, often are integrated into a number of safety critical systems, such as the stability control system of an automobile. If the gyroscope of a stability control system malfunctions, it can cause the automobile to lose control and crash. Accordingly, testing is important, and often critical, prior to implementation in such a system.

As known by those in the art, there is a continuing demand to produce more sensitive and precise microelectronic components. Continuing with the gyroscope example, space or military system integrators currently require gyroscopes with measurement ranges up to 40,000 degrees per second over a wide range of vibration frequency, from 10 Hz to 1000 Hz, or cycles per second. Current testers known to the inventors, however, are incapable of accurately testing gyroscopes at such extreme test conditions. For example, reasonably accurate gyroscope testers known to the inventors can test only up to 10,000 degrees per second and at constant rotational rate only, i.e. DC. This leaves a significant unknown in the performance of high rate gyroscopes.

SUMMARY OF VARIOUS EMBODIMENTS OF THE INVENTION

In accordance with one embodiment of the invention, a microelectronic device tester has a mounting member (for mounting a device), a drive shaft connected to the mounting member, and a vibration shaft mechanically in communication with the drive shaft. The drive shaft and vibration shaft are non-coaxial, and the drive shaft has a drive shaft proximal end and a drive shaft distal end. The drive shaft proximal end is connected to the mounting member, and the drive shaft distal end terminates proximal of the entire vibration shaft.

The tester also may have a drive member with a proximal side coupled with the distal end of the drive shaft, and a distal side coupled with the proximal end of the vibration shaft. Alternatively, or in addition, the drive shaft distal end may be connected directly to and be integral with the vibration shaft.

To rotate the mounting member, the tester may have a mass coupled with the vibration shaft. The mass may be configured to move linearly to cause the mounting member to rotate. To move the mass, the tester also may have an actuator in communication with the mass. The actuator is configured to generate a force that causes the mass to move linearly.

In some embodiments, the mounting member has a substantial center to which the drive shaft is secured. Alternative embodiments, however, may mount the drive shaft elsewhere. The drive shaft also may be considered as forming a drive shaft projection on the mounting member. In a corresponding manner, the vibration shaft may be considered as forming a vibration shaft projection on the mounting member. At least a portion of the vibration shaft projection, in some embodiments, intersects the drive shaft projection.

To determine the actual rotational speed of the mounting member, the tester may have a reference rotational detector coupled with the mounting member. Moreover, among other things, the tester may have a MEMS gyroscope secured to the mounting member—the MEMS gyroscope is the component being tested.

In accordance with another embodiment of the invention, a microelectronic device tester has a mounting member for mounting a device, a drive shaft connected to the mounting member, and a vibration shaft mechanically in communication with the drive shaft. The drive shaft and vibration shaft are non-coaxial, and the drive shaft is considered as forming a drive shaft projection on the mounting member. In a corresponding manner, the vibration shaft is considered as forming a vibration shaft projection on the mounting member. At least a portion of the vibration shaft projection intersects the drive shaft projection.

In accordance with other embodiments of the invention, a method of testing a microelectronic device provides a tester having a mounting member, mounts a microelectronic device to the mounting member, and rotates the mounting member to generate a test signal from the microelectronic device. In addition to having the mounting member, the tester also has a drive shaft connected to the mounting member, and a vibration shaft mechanically in communication with the drive shaft. The drive shaft and vibration shaft are non-coaxial. Moreover, the drive shaft is considered to form a drive shaft projection on the mounting member, while the vibration shaft is considered to form a vibration shaft projection on the mounting member. At least a portion of the vibration shaft projection intersects the drive shaft projection.

The tester may have a reference device mounted to the mounting member, where the reference device produces a reference signal when rotated. In that case, the method further may compare the test signal with the reference signal to determine the accuracy of the device under test (e.g., a MEMS gyroscope). Moreover, among other ways, the method may rotate the mounting member back and forth in a periodic manner. In some embodiments, the method rotates the mounting member (and, consequently, its mounted device) at a rate of between about 30,000 and about 40,000 degrees per second, or more than about 40,000 degrees per second from 10 to 1000 Hertz. To generate the motion, the tester further may include a mass connected with the vibration shaft. The method thus may cause the mass to move linearly in a direction that is generally orthogonal to the drive shaft.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments effectively and accurately test upper angular velocity limits of high performance rotational measurement devices, such as MEMS gyroscopes. For example, the upper velocity limits may approach or exceed about 40,000 or about 50,000 degrees per second. To that end, illustrative embodiments orient a drive shaft relative to a vibration shaft in a manner that enables an underlying testing apparatus to produce these desired and often necessary results. Details of illustrative embodiments are discussed below.

Micromachined gyroscopes (often referred to as a MEMS gyroscope) are widely used to measure rotation of an underlying system. For example, as noted above, a gyroscope mounted to an automobile chassis can deliver information to a central computer relating to the movement of that automobile. After receiving such information, the central computer can control braking or other safety critical systems, stabilizing the automobile and reducing the likelihood of a crash or other adverse event. Of course, MEMS gyroscopes have many other applications and thus, discussion of their use with an automobile is for exemplary purposes only.

The principles of vibratory sensing angular rate gyroscopes are long-established. See, for example, U.S. Pat. No. 6,877,374, assigned to Analog Devices, Inc. of Norwood, Mass. Generally speaking, a vibratory rate gyroscope works by oscillating a proof mass (also referred to herein as a "shuttle" or "resonator"). The oscillation is generated with a periodic force applied to a spring-mass-damper system preferably at the resonant frequency. Operating at resonance allows the oscillation amplitude to be large relative to the force applied.

When the gyroscope is rotated, Coriolis acceleration is generated on the oscillating proof mass in a direction orthogonal to both the driven oscillation and the rotation. The magnitude of the Coriolis acceleration is proportional to both the velocity of the oscillating proof mass and the rotation rate. The resulting Coriolis acceleration therefore can be measured by sensing the deflections of the proof mass.

Figure 1A:
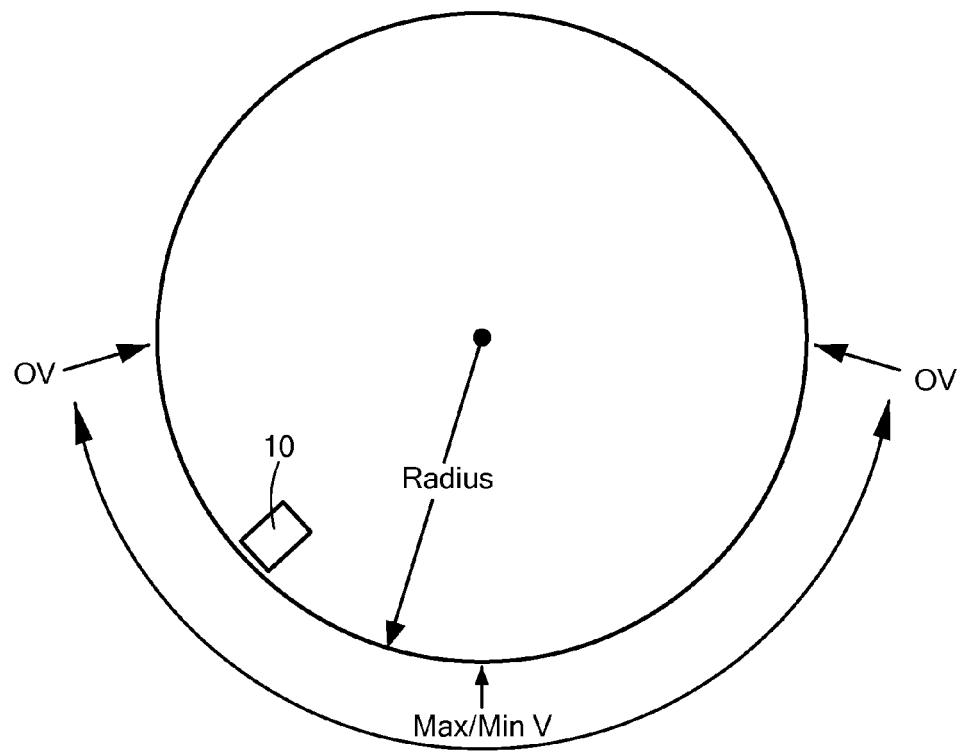
FIG. 1A schematically shows the motion of a device during testing using a testing apparatus configured in accordance with illustrative embodiments of the invention.
Figure 1B:
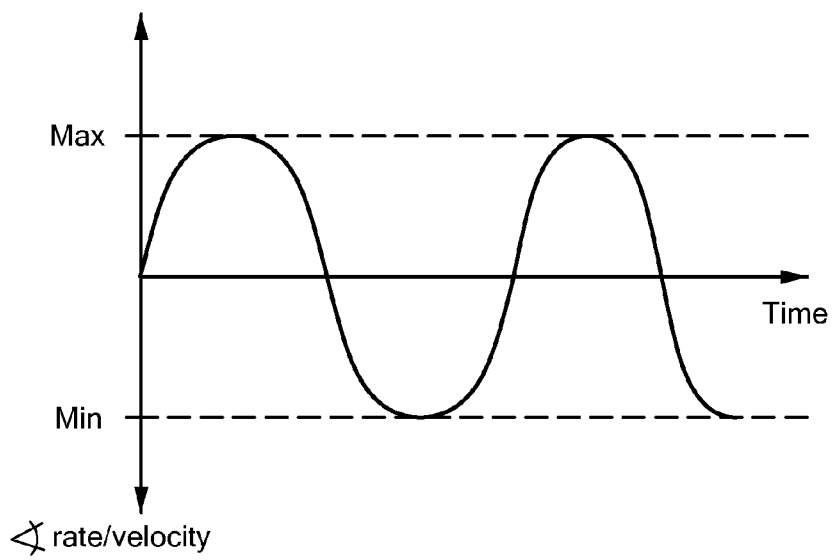
FIG. 1B graphically shows the angular velocities of a device during testing with a testing apparatus configured in accordance with illustrative embodiments of the invention.

Accordingly, those skilled in the art typically test gyroscopes before they are used in an underlying system—to ensure accurate measurement of the deflections of the proof mass. To that end, illustrative embodiments rotate the gyroscope at a very high rate, detect the output of the gyroscope under test, and compare the performance to actual rotation. FIGS. 1A and 1B schematically show a generalized apparatus and technique for testing a gyroscope using an AC testing force.

More specifically, FIG. 1A schematically shows a gyroscope 10 mounted to the outer portion of a rotational device having a radius identified as "Radius." Although the gyroscope 10 preferably is mounted near the edge of the rotational device, some embodiments mount it nearer to the center of the rotational device. As shown in FIG. 1B, the rotational device rotates the gyroscope 10 in a sinusoidal, varying manner.

Simply put, the rotational device rotates back and forth for a predetermined arc length, and at one of a plurality of frequencies, to produce a continually changing, AC angular velocity. For example, as shown in FIG. 1B, this velocity can take on the form of a sinusoidal wave extending from a maximum angular velocity to a minimum angular velocity. In other words, various embodiments substantially continuously change the rotational speed of the gyroscope 10 being tested so that its angular velocity oscillates between a maximum and a minimum over time. For example, the maximum angular velocity may be about 40,000 degrees per second, while the minimum angular velocity may be about −40,000 degrees per second. Those skilled in the art should understand, however, that these endpoints may fluctuate, depending upon the test and capabilities of the gyroscope 10. For example, the endpoints may be +/−30,000 degrees per second, 25,000 degrees per second and −20,000 degrees per second, or other values. Moreover, rather than taking on a sinusoidal configuration, alternative embodiments may change the angular acceleration according to some other waveform, such as a linear pattern, or step functions. Accordingly, discussion of a sinusoidal actuation pattern is but one of various anticipated implementations.

It is expected that the gyroscope 10 reaches its maximum and minimum velocities about halfway through each period of the cycle. Specifically, FIG. 1A schematically shows an example of where the maximum and minimum values may be applied to the gyroscope 10. As shown, the points identified as "0 V" are where the rotating device stops and changes direction. It is at these "0 V" points that the sinusoidal wave intersects the X-axis (i.e., the time-axis).

The point identified as "max/min V" is the point where the respective maximum and minimum values are attained. For example, the angular acceleration can be about 40,000 degrees per second at that point when rotating counterclockwise, and about −40,000 degrees per second at that point when rotating clockwise. Immediately after passing that point, the angular acceleration should slow to about zero. After attaining an acceleration of zero, the angular acceleration changes signs to move in the opposite direction. This process continues until enough data is collected and compared against the actual, acceleration of the rotational device.

As noted, the gyroscope 10 may rotate at high velocities at a range of frequencies. Specifically, the angular velocity is directly proportional to the product of the frequency and the angle of rotation. Accordingly, to attain a predetermined rotational velocity, if the frequency is higher, then the angle of rotation should be lower, and vice versa. For example, the gyroscope 10 can rotate at frequencies that are as low as about 10 Hertz, to those that are as high as (or higher than) about 1000 Hertz.

Figure 2:
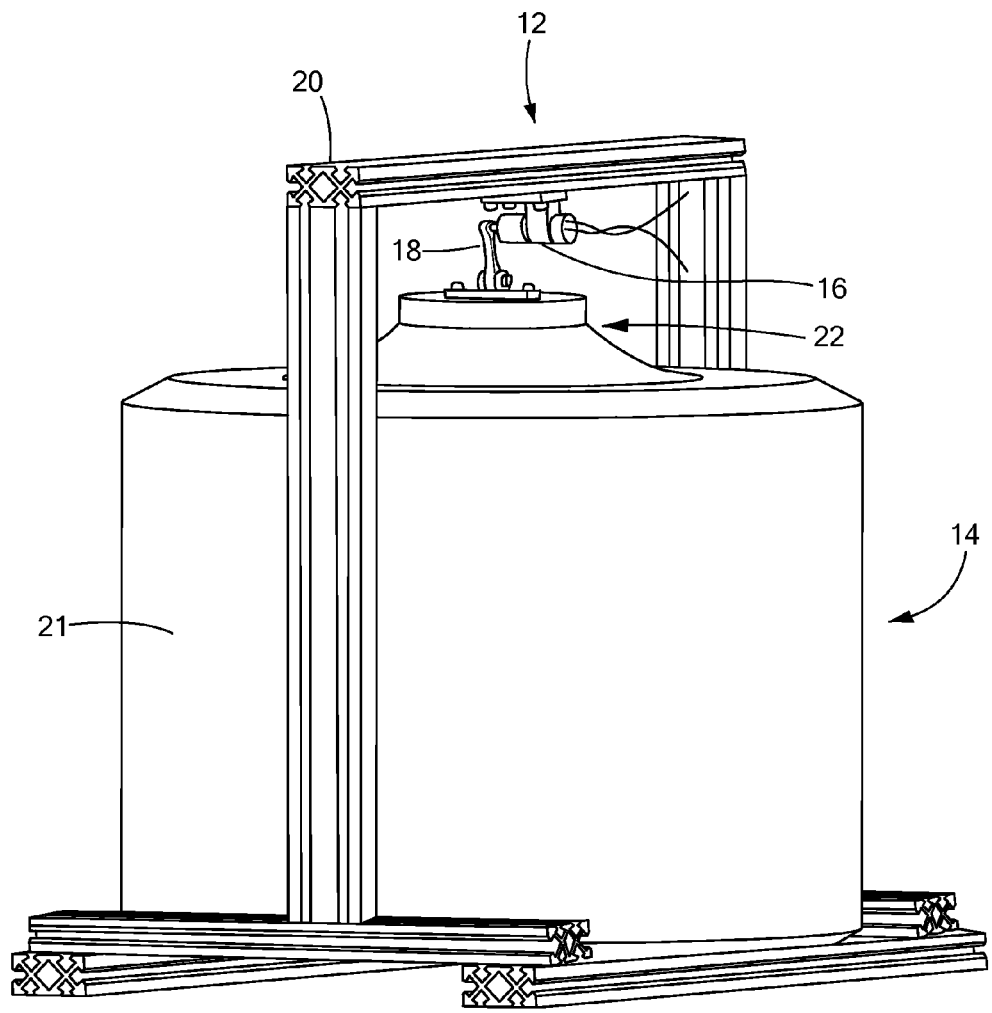
FIG. 2 schematically shows a testing apparatus configured in accordance with illustrative embodiments of the invention.

FIG. 2 schematically shows one implementation of a testing device 12 for producing the rotational accelerations of FIGS. 1A and 1B with high maxima and minima, such as those discussed above. More specifically, the testing device 12 of FIG. 2 has a shaking mechanism 14 that moves linearly, a rotational mechanism 16 for mounting and rotating the gyroscope 10, and a linkage 18, between the shaking mechanism 14 and the rotational mechanism 16, for converting the linear motion of the shaking mechanism 14 into a rotational force imparted on the gyroscope 10. A fixed frame 20 suspends these three interconnected components over a surface.

A force actuates the shaking mechanism 14 to rotate a movable portion of the rotational mechanism 16 via the linkage 18. In one embodiment, the shaking mechanism 14 includes a mass 22 (FIG. 3), such as a metallic armature, within a housing 21. In illustrative embodiments, the mass 22 linearly oscillates when subjected to a corresponding oscillating electromagnetic field produced by some local actuation device. Among other things, the armature 22 may be formed from beryllium copper, aluminum, or other appropriate metal used for these purposes. Other embodiments may use different types of forces, such as hydraulic forces or pressure forces, to linearly oscillate the armature 22 or a corresponding component. It should be noted that in FIG. 2, reference number 22 points to an area of the housing 21 that covers the mass 22.

Figure 3:
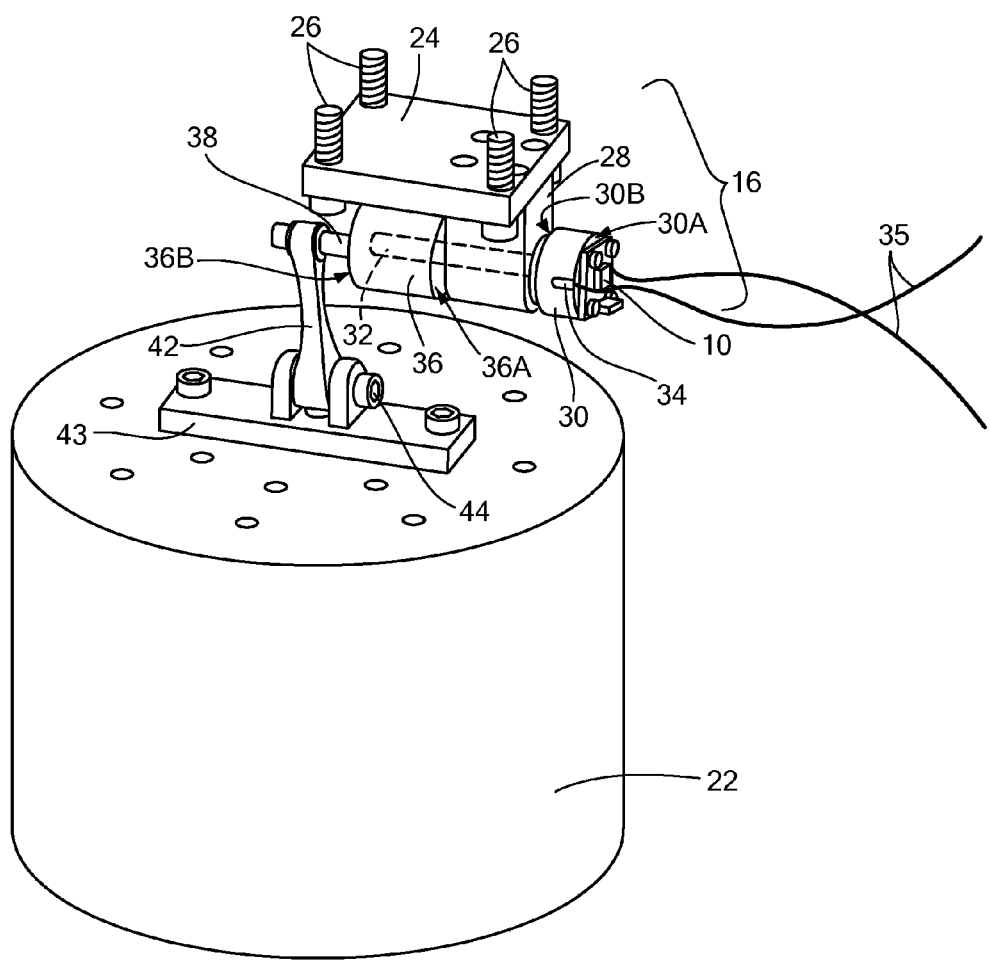
FIG. 3 schematically shows additional details of the testing apparatus shown in FIG. 2.

FIG. 3 schematically shows more details of the shaking mechanism 14, linkage 18, and rotational mechanism 16. As shown, the rotational mechanism 16 has a top platform 24 with four bolts 26 for screwing to the frame 20, thus supporting the overall apparatus (i.e., supporting the shaking mechanism 14, rotational mechanism 16, and linkage 18). A support block 28 extends downwardly from the platform 24 to support the majority of the rotational mechanism 16.

More specifically, the rotational mechanism 16 includes a mounting member 30 having a proximal face 30A for removably carrying the gyroscope 10, and an opposed distal surface 30B coupled with a drive shaft 32 (shown in phantom in FIG. 3). It should be noted that unlike the gyroscope 10 shown in FIG. 1A, the gyroscope 10 shown in this embodiment is generally near the central portion of the mounting member 30 and thus, relatively close to the point of rotation.

In addition to carrying the gyroscope 10, the mounting member 30 also carries a rotational measurement device 34 for determining its rotational speed and thus, that of the gyroscope 10. This other device 34 should be one that has tested reliability and can accurately detect high angular velocities. In illustrative embodiments, this other device 34 includes two spaced MEMS accelerometers (also referred to using reference number "34"). As known by those in the art, two spaced accelerometers 34 can appropriately detect angular velocity. Other embodiments may use other devices 34, such as pre-tested and certified gyroscopes or other devices. A pair of wires 35 may extend from the accelerometers 34 to receive the rotational information from the reference device(s) 34 and the gyroscope 10.

It should be noted that the terms ""proximal "and "distal" are used herein to identify portions of the apparatus, or directions, relative to the gyroscope 10 or device under test. In particular, something facing or directed toward the gyroscope 10 would be considered to be facing "proximally," while something facing or directed away from the gyroscope 10 would be considered to be facing "distally." This is why the proximal face 30A of the mounting member 30 mounts or faces the gyroscope 10, while its opposite, distal face 30B faces the opposite direction.

The drive shaft 32 extends distally from the distal face 30B of the mounting member 30, through one or more bearings (not shown) within the support block 28, and terminates at its distal end, which secures directly into a drive member 36. In illustrative embodiments, the drive shaft 32 is integral with and generally centrally mounted with the mounting member 30 and/or the drive member 36. Some embodiments may have a plurality of snap rings (not shown) that cooperate with the bearing to mitigate or substantially eliminate linear motion along the drive shaft 32. Accordingly, the drive member 36 and drive shaft 32 rotate at the same rate.

The drive member 36 receives the rotational force, via the linkage 18, to rotate the drive shaft, mounting member 30, and the MEMS gyroscope 10. To that end, the drive member 36 has a proximal face 36A coupled with the drive shaft 32, and a distal face 36B coupled with a proximal end of a vibration shaft 38 that is positioned off-center with respect to the drive shaft 32. The distal end of the drive shaft 32 therefore terminates proximal of the entire vibration shaft 38. In other words, no portion of the drive shaft 32 extends as far distally as the vibration shaft 38. Moreover, the drive member 36 may be considered to space the drive shaft 32 from the vibration shaft 38.

To rotate the drive shaft 32, the vibration shaft 38 preferably is positioned so that its longitudinal axis is parallel to, but not coincident with, the longitudinal axis of the drive shaft 32. This produces a lever arm with a size that should be minimized to increase the rotational velocity. To reduce the lever arm between it and the drive shaft 32, the longitudinal axis of the vibration shaft 38 preferably is very close to that of the drive shaft 32. Those skilled in the art can determine and test an appropriate lever arm size based upon a number of factors, such as the device being tested, the anticipated rotational speeds, the materials of the components, etc . . . to arrive at an appropriate configuration. Manufacturing tolerances, materials used for the components, and machining of metal parts should be considered in reducing the length of that lever arm.

Figure 4:
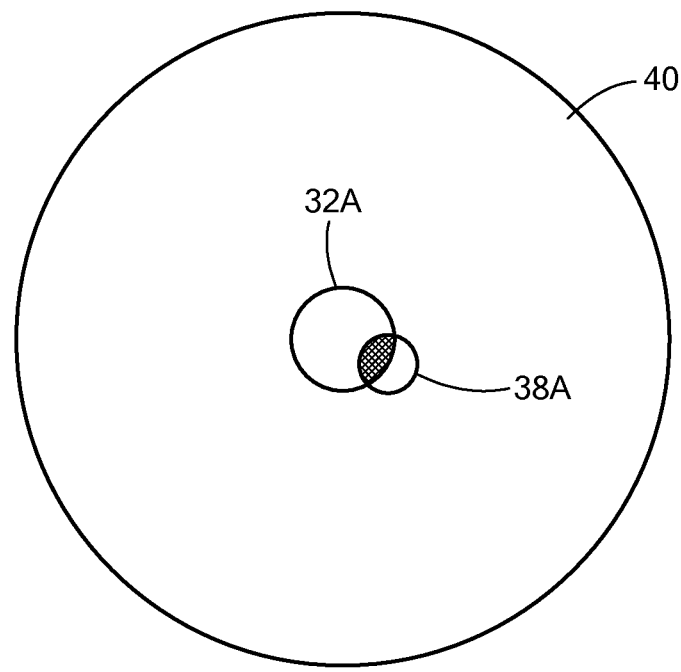
FIG. 4 schematically shows the intersecting projections of the drive shaft and the vibration shaft in accordance with illustrative embodiments of the invention.

FIG. 4 schematically shows one relationship of the drive shaft 32 and the vibration shaft 38 in accordance with illustrative embodiments. As shown, the two shafts are considered to form projections on a plane 40. For convenience, the plane 40 of the drive member 36 or mounting member 30 may be used, although other planes should suffice. The plane 40 thus may be considered to include the drive shaft projection 32A, and the vibration shaft projection 38A. As shown, the two projections 32A and 38A intersect (at the shaded region) but are not coincident—in other words, the longitudinal axes are parallel but do not share a common central rotation point. Accordingly, the vibration shaft 38 orbits or rotates about the center of the drive shaft 32.

As noted, the linkage 18 translates the linear motion of the armature 22 into rotational motion of the drive shaft 32 and related components. Accordingly, as shown in FIG. 3, the linkage 18 includes a connecting arm 42 having a top end movably secured to the vibration shaft 38, and a bottom end rotationally secured to a mounting bracket 43 coupled with the armature 22. Among other things, the linkage 18 may have an opening at its top for receiving the vibration shaft 38, and an opening at its bottom for securing to the mounting bracket 43 on the top of the armature 22. A bolt 44 may secure the bottom end of the arm 42 to the mounting bracket 43, while a pin (not shown) may retain the arm 42 on the vibration arm. Adequate lubrication and bearings may facilitate this rotational connection.

The linkage 18, members 30 and 36, and shafts 32 and 38 should be formed from a material that can withstand anticipated rotational velocities of up to 40,000 or even 50,000 degrees per second. For example, the shafts 32 and 38 may be formed from stainless steel.

During use, a force, such as one produced by an electromagnetic field, applies a force to the armature 22, causing it to linearly vibrate—back and forth—generally in a straight line generally orthogonal to the drive shaft 32. The connecting arm 42 translates this linear motion into rotational motion through its connection with the vibration shaft 38 extending from the distal face 36B of the drive member 36. The off-center relationship between the vibration shaft 38 and the drive shaft 32 causes the drive member 36 to rotate about the axis of the drive shaft 32 in a sinusoidal manner (i.e., assuming the armature 22 is moving in a corresponding manner) as described above. The mounting member 30 correspondingly rotates to impart a rotational velocity to the gyroscope 10 mounted to its proximal face 30A. The velocity measurements from the gyroscope 10 are compared to those of the two accelerometers to determine the accuracy of the gyroscope 10.

Figure 5:
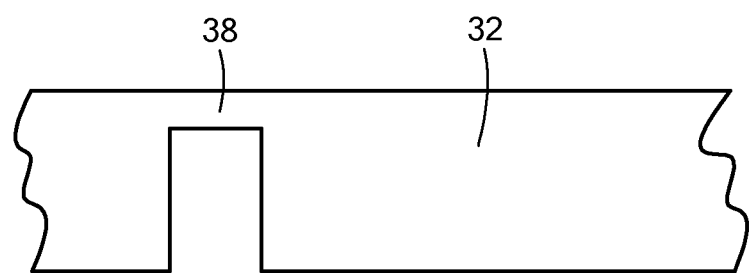
FIG. 5 schematically shows one embodiment of a modified drive shaft with an integrated vibration shaft.

Some embodiments do not have all the discussed components. For example, it is anticipated that the drive member 36 can be eliminated. In such a case, the distal end of the drive shaft 32 may directly connect to the proximal end of the vibration shaft 38, or be integrated into the drive shaft 32 in a manner similar to the embodiment shown in FIG. 5. In some such embodiments, the vibration shaft 38 has a smaller diameter than that of the drive shaft 32.

Although the above discussion discloses various exemplary embodiments of the invention, it should be apparent that those skilled in the art can make various modifications that will achieve some of the advantages of the invention without departing from the true scope of the invention. For example, the testing apparatus could be used to test devices other than MEMS gyroscopes.

What is claimed is:

1. A microelectronic device tester comprising:
   a mounting member for mounting a device, the mounting member having a substantial center;
   a drive shaft connected to the substantial center of the mounting member; and
   a vibration shaft mechanically in communication with the drive shaft, the drive shaft and vibration shaft being non-coaxial,
   the drive shaft forming a drive shaft projection on the mounting member,
   the vibration shaft forming a vibration shaft projection on the mounting member, at least a portion of the vibration shaft projection intersecting the drive shaft projection.

2. The microelectronic device tester as defined by claim 1 further comprising a drive member having a proximal side coupled with one end of the drive shaft, the drive member also having a distal side coupled with one end of the vibration shaft, the drive member spacing the drive shaft from the vibration shaft.

3. The microelectronic device tester as defined by claim 1 wherein the drive shaft is connected directly to and integral with the vibration shaft.

4. The microelectronic device tester as defined by claim 1 further comprising means for engaging the vibration shaft to cause the mounting member to rotate in a sinusoidal manner.

5. A method of testing a microelectronic device, the method comprising:
   providing a tester comprising:
      mounting member for mounting a device;
      a drive shaft connected to the mounting member; and
      a vibration shaft mechanically in communication with the drive shaft, the drive shaft and vibration shaft being non-coaxial,
      the drive shaft forming a drive shaft projection on the mounting member, the vibration shaft forming a vibration shaft projection on the mounting member, at least a portion of the vibration shaft projection intersecting the drive shaft projection;
   mounting a microelectronic device to the mounting member; and
   rotating the mounting member to generate a test signal from the microelectronic device.

6. The method as defined by claim 5 wherein the tester has a reference device mounted to the mounting member, the reference device producing a reference signal when rotated, the method further comprising:
   comparing the test signal with the reference signal.

7. The method as defined by claim 6 wherein rotating comprises rotating the mounting member back and forth in a periodic manner.

8. The method as defined by claim 6 wherein the microelectronic device comprises a MEMS gyroscope.

9. The method as defined by claim 6 wherein rotating comprises rotating at a rate of up to about 40,000 degrees per second over a plurality of rotating frequencies.

10. The method as defined by claim 6 wherein the tester further comprises a mass connected with the vibration shaft, the method further comprising:
    causing the mass to move linearly in a direction that is generally orthogonal to the drive shaft.

11. A microelectronic device tester comprising:
    a mounting member for mounting a device;
    a drive shaft connected to the mounting member; and
    a vibration shaft mechanically in communication with the drive shaft, the drive shaft and vibration shaft being non-coaxial,
    the drive shaft forming a drive shaft projection on the mounting member,
    the vibration shaft forming a vibration shaft projection on the mounting member, at least a portion of the vibration shaft projection intersecting the drive shaft projection;
    the microelectronic device tester further comprising means for engaging the vibration shaft to cause the mounting member to rotate in a sinusoidal manner.

12. The microelectronic device tester as defined by claim 11 further comprising a drive member having a proximal side coupled with one end of the drive shaft, the drive member also having a distal side coupled with one end of the vibration shaft, the drive member spacing the drive shaft from the vibration shaft.

13. The microelectronic device tester as defined by claim 11 wherein the drive shaft is connected directly to and integral with the vibration shaft.

14. The microelectronic device tester as defined by claim 11 wherein the mounting member has a substantial center, the drive shaft being secured to the substantial center of the mounting member.

* * * * *